United States Patent Office 3,070,505
Patented Dec. 25, 1962

3,070,505
ANTIBIOTIC PROCESS
Karl Heinz Fantes, Bushey, and Brian Boothroyd, Beaconsfield, England, assignors to Glaxo Laboratories Limited, Greenford, England, a British company
No Drawing. Filed June 2, 1960, Ser. No. 33,362
Claims priority, application Great Britain June 8, 1959
14 Claims. (Cl. 167—65)

This invention is concerned with improvements in or relating to antibiotics.

In U.S. application No. 767,343, filed October 15, 1958, and now abandoned, there is described a new antibiotic there termed E. 129 produced by the culture of the organism *Streptomyces ostreogriseus* NRRL No. 2558 and now designated as ostreogrycin. This antibiotic comprises a number of factors, one of which, designated factor B, is a new substance and is described in U.S. application No. 806,295, filed April 14, 1959. In U.S. application No. 714,171, filed February 10, 1958, there are described synergistic compositions containing factor B in combination with ostreogrycin factor Z, which compositions have been shown to have important synergistic effects. In British specification No. 33,967/58, a further new factor present in ostreogrycin is also described, designated factor $z_3$, which factor is chemically different from but similar in properties to factor Z.

The said applications further show that ostreogrycin factors A and Z are identical with two antibiotic factors previously described known as PA.114.A and PA.114.B, and reference is also made to a further antibiotic, streptogramin, which is believed to comprise one at least of the factors present in ostreogrycin. Other antibiotic materials are now also known possessing some similarity in properties to ostreogrycin, such further antibiotics including particularly staphylomycin (De Somer et al., Antibiotics and Chemotherapy, 1955, 632–639) and etamycin (Heinemann et al., Antibiotics Annual, 1954–55, 728–732). The last mentioned antibiotic is identical with an antibiotic termed viridogrisein (Bartz et al., Antibiotics Annual, 1954–54, 777–789).

There are thus a number of antibiotics which are apparently closely related in chemical structure and whose biological properties whilst showing some similarity, have important differences. It is a common feature of the above-mentioned antibiotics that, in general, they comprise factors of comparatively low antibiotic activity per se, but which, in combination with other factors present also of low activity, show remarkable synergism and high antibacterial effect. Furthermore, mixtures of two or more of the various factors in different combinations and proportions are produced by different organisms. Etamycin, however, is somewhat different in its biological properties in that it does possess substantial activity per se.

The above-mentioned group of antibiotics will for convenience be hereinafter referred to collectively as "the ostreogrycin group" and the individual factors referred to as "factors of the ostreogrycin group."

In U.S. application No. 859,589, filed December 15, 1959, and now abandoned, it is disclosed that antibiotic factors of the ostreogrycin group may be solubilized by mixture with a physiologically acceptable water-soluble amide, in particular urea, and have further described antibiotic compositions of improved water-solubility, comprising one or more of said factors of the ostreogrycin group, together with a water-soluble physiologically acceptable amide.

The separation of the various factors of the ostreogrycin group provides considerable difficulties having regard to their close chemical similarity, the similarity between ostreogrycin factors A and B being particularly close. Methods which have been suggested for separation include counter-current solvent extraction and partition chromatography, but difficulty has in general been encountered in obtaining a sharp separation by such methods.

Separation by solvent extraction techniques and also partition chromatography depend for their success upon there being a difference between the partition coefficients of the substances to be separated in the two phases of the solvent system used and the greater such difference the more efficient and readily carried out is the extraction procedure.

In application No. 859,589, above referred to, is shown that the water solubility of factors of the ostreogrycin group (which is generally poor) is considerably enhanced by the presence of water-soluble amides. Following further research it has been found that surprisingly the partition coefficients of the various ostreogrycin factors as between aqueous amide solutions and organic solvents is markedly different. Especially is this difference great as between factor A and factor B.

These marked differences appear from the following data, which has been obtained for various solvent systems but which is given for the purpose of illustration only.

TABLE I

Partition coefficients for factors A, B and Z as between solutions in aqueous urea (concentration of 3 gm. urea dissolved in 4 ml. water) and certain solvents.

| | Ethyl acetate | Butyl acetate | Ethyl carbonate |
|---|---|---|---|
| Partition coefficient for factor A ($K_A$) | 1.55 | 0.76 | 0.65 |
| Partition coefficient for factor B ($K_B$) | 0.31 | 0.14 | 0.11 |
| Partition coefficient for factor Z ($K_Z$) | 8.7 | 3.3 | |
| Ratio $K_A/K_B$ | 5.0 | 5.4 | 5.9 |
| Ratio $K_Z/K_A$ | 5.6 | 4.4 | |

TABLE II

Partition coefficients of factors A, B and Z as between benzene and aqueous nicotinamide (concentration of 1 gm. nicotinamide dissolved in 2 ml. of water).

Factor A($K_A$)=0.095
Factor B($K_B$)=0.007
Factor Z($K_Z$)=1.25
Factor $Z_3$($K_{Z3}$)=0.38
Ratio $K_A/K_B$=13.5
Ratio $K_Z/K_A$=13.2

TABLE III

Partition coefficients of factor A, B and Z as between ethyl acetate and aqueous dimethylformamide and aqueous acetamide.

| | Dimethylformamide 1:water 1 | Acetamide 1:water 1.5 |
|---|---|---|
| Factor A($K_A$) | 1.83 | 2.70 |
| Factor B($K_B$) | 0.66 | 0.90 |
| Factor Z($K_Z$) | 4.8 | 10.2 |
| Ratio $K_A/K_B$ | 2.8 | 3.0 |
| Ratio $K_Z/K_A$ | 2.6 | 3.8 |

As will be appreciated the efficiency of any method of separation of ostreogrycin factors involving distribution between two phase solvent systems depends upon the ratio of the partition coefficients of the respective factors in such systems, the greater such ratios the more efficient the separation. From the figures quoted it will be seen that the ratio of the partition coefficients of the factors between aqueous amides and organic solvents which dissolve the factors is high and that thus distribution of the factors in such systems can provide an efficient separation. It will further be seen that aqueous solutions of urea and of nicotinamide are particularly valuable in this regard.

According to the invention therefore we provide a process for the separation of a mixture comprising two or more factors of the ostreogrycin group which comprises distributing said mixture in a two phase solvent system comprising an aqueous solution of a water soluble amide and an organic solvent for at least one of said factors at least partially immiscible with said aqueous solution separating said phases and recovering an ostreogrycin factor of increased purity from at least one of said phases.

The process of the invention is particularly applicable to the separation of mixtures comprising at least two of the factors, A, B and Z.

In a preferred method of carrying out the invention the ostreogrycin factor mixture is dissolved in the aqueous amide solution and extracted with an ostreogrycin factor solvent.

The term "water-soluble amide" as used herein means any amide which has a substantial solubility in water, an aqueous solution of which is capable of dissolving at least one factor of the ostreogrycin group to a greater extent than water and which is without substantial detrimental action on said factor. Such water-soluble amides include in particular urea, nicotinamide, and amides of lower aliphatic carboxylic acids ($C_1$–$C_4$) such as acetamide and formamide, as well as N-alkyl and N,N-dialkyl derivatives thereof (wherein the alkyl group contains 1–4 carbon atoms) e.g. dimethyl formamide and dimethyl acetamide. Aqueous solutions of urea appear to be particularly efficient and satisfactory.

It is generally preferable that the concentration of water soluble amide in the aqueous solution should be high. In the case of the normally solid amides e.g. urea and nicotinamide it is preferred that the solutions should be at least 50% saturated with respect to the amides and desirably at least 75% saturated. Best results are obtained with solutions which are substantially saturated. In the case of normally liquid amides (e.g. dimethyl formamide) which are miscible in all proportions with water, the proportion thereof should be high but sufficient water must be present to ensure formation of a two-phase system with the organic solvent used. In such cases the concentration of amide is preferably from 25% to 75% by volume and desirably 40% to 60%. By the term "normally" as applied to the liquid and solid amides we refer to the physical state at ambient temperature i.e. 20° C.

The organic solvent used in the present process must be immiscible or only partially miscible with the aqueous amide solution and be a solvent in which the ostreogrycin factor or factors have relatively good solubility.

As will be seen from the above tables the distribution of a given factor as between aqueous amides and organic solvents varies from solvent to solvent and thus some solvents can be regarded as preferential solvents for a given factor. Thus by partitioning the factor mixture in the aqueous amide solution against a solvent which preferentially extracts one factor, followed by partitioning against a second solvent preferentially extracting a second factor and so on, ready separation is achieved. In the case of factors A, B and Z for example in general the ease of extraction of these factors is in the order Z, A, B, which enables separation to be achieved by extraction with poor, intermediate, and good solvents respectively in that order. In general the greater the polarity of a solvent the greater is its solvent power for ostreogrycin factors.

The process according to the invention is particularly applicable to the treatment of crude ostreogrycin to separate factor B therefrom and thus it can be used with particular advantage in the treatment of crude ostreogrycin containing principally factors A and B and a proportion of factor Z to separate factor B therefrom. The invention will, therefore, now be described with particular reference to the treatment of such crude ostreogrycin.

In the treatment of such crude ostreogrycin the material may be first dissolved in an aqueous solution of a water soluble amide, preferably urea, to dissolve at least a part of the material. It is preferred to use a concentrated urea solution, and we have thus found it preferable to use a urea solution containing from 0.5–1 part by weight of urea to one part of water. A particularly preferred urea solution is one containing 3 parts by weight of urea to 4 parts by weight of water. It should be noted that such strong solutions have an alkaline reaction and are preferably adjusted to a neutral or slightly acid pH, for example a pH of 6.5, before use, by the addition of acid, for example strong mineral acid, such as 2 N hydrochloric acid.

As factors A and B have different solubilities in strong urea solutions, factor B having a solubility of approximately twice that of factor A, the ratio of these factors in the solution will not be the same as in the crude ostreogrycin if insufficient urea solution is used to dissolve both factors completely. Thus, one may effect a partial separation of factors A and B by using less urea solution than will dissolve both of these factors completely, and it is in fact preferred to operate in such a manner.

The urea solution containing factors A and B as well as some factor Z is then extracted with a solvent which preferentially extracts factors A and Z from solution. Factor B, which remains in solution, can then be removed by extraction with a solvent which has a good dissolving power for factor B. Preferred preferential solvents for factors A and Z are, for example, organic esters, in particular lower alkyl esters of lower aliphatic carboxylic acids, such as formic, acetic and propionic acid. Particularly preferred solvents are ethyl acetate, butyl acetate and amyl acetate of which ethyl acetate is the most preferred. These solvents dissolve factors A and Z preferentially from mixtures containing these factors and factor B and also have a high solvent power for the said factors A and Z so that it is not necessary to use undesirably large quantities of these solvents for extraction.

Where it is desired to achieve separation as between the factors A and Z, the extraction can first be effected with a preferential solvent for factor Z for which purpose aromatic hydrocarbon solvents, e.g. benzene and toluene are satisfactory.

After the bulk of the factors A and Z has been extracted from the urea solution, the factor B remaining may be extracted with any good solvent for factor B, so that the factor may readily be extracted without a large bulk of solvent being necessary. Such a solvent is for example a chlorinated hydrocarbon for example chloroform, methylene chloride, or ethylene dichloride, of which chloroform is preferred.

In order to achieve as complete a separation as possible the extraction of the urea solution with the preferential solvent for factors A and Z is preferably carried out with successive volumes of solvent, the extract in the last volume being backwashed with an equal quantity of urea solution so as to re-extract a quantity of the factor not being preferentially extracted. This urea solution is combined with that which has been extracted and the solution extracted with a good solvent for the factor present therein.

The process according to the invention may of course be carried out by continuous counter-current extraction techniques using for example a Craig counter-current extraction apparatus. On the larger scale Podbelniak or York-Schiebel types of apparatus may for example be used; many types of such apparatus are well known which may include packed or unpacked, or pulsed columns. The process of the present invention may also be applied to the separation of the ostreogrycin factors by partition chromatography using the aqueous amide solution as the static phase and the organic solvent as mobile phase. Suitable absorbents are for example kieselguhr, silica and powdered cellulose. Partition chromatography may of course be regarded as a form of counter-current extractions. When applying the present process to partition chromatography the feed to the column will generally comprise a solution of the mixture to be separated in the aqueous amide. To reduce the volume of the actual feed, it may further comprise a water-miscible solvent for ostreogrycin factors, e.g. methanol or propylene glycol to enhance the solubility of the factor mixture therein.

As will be appreciated, the process according to the invention applied to the separation of factor B from crude ostreogrycin or indeed from any crude material containing or consisting of a mixture of antibiotic factors of the ostreogrycin group, including factor B, provides a two stage separation, the first separation taking place when the material is dissolved in the aqueous solution of the water-soluble amides, as the factors are preferentially soluble in such a solution, and the second separation being effected when the solution is preferentially extracted.

The process according to the invention can also with advantage be applied to the purification of partially purified antibiotic factors of the ostreogrycin group, and thus may be applied to the purification of crude factor B by dissolving said factor in urea solution and removing other ostreogrycin factors present as contaminants by preferential extraction.

In order that the invention may be well understood, the following examples are given by way of illustration only.

*Example 1*

30 gm. of crude ostreogrycin containing 57% factor A and 27.5% factor B was stirred for 2 hours with 500 ml. (3:4) urea solution. This gave a level of 60 mgm./ml. total solid and 16 mgm./ml. factor B. The suspension was filtered and the solid washed with water which was discarded. The filtrate was extracted 2 x 1 vol. with ethyl acetate and the final ethyl acetate extract backwashed with an equal volume of (3:4) urea solution, the two urea solutions were combined and extracted 1 x 1 and finally 1 x ½ vol. with chloroform.

All solvent extracts were washed with water, evaporated down to small volume and precipitated by pouring into petroleum ether. All final solids were assayed by bioautograph for A and B content.

|  | Weight (gm.) | A percent | B percent | A (gm.) | B (gm.) |
|---|---|---|---|---|---|
| (1) Combined EtAc | 4.740 | 47.0 | 21.4 | 2.22 | 1.1 |
| (2) 1st CHCl₃ | 2.907 | 22.7 | 67.1 | 0.66 | 1.95 |
| (3) 2nd CHCl₃ | 0.171 | 5 | 67.0 | 0 | 0.11 |
| (4) Residue | 18.190 | 69.7 | 8.7 | 12.65 | 1.58 |
| Total | 26.008 |  |  | 15.53 | 4.74 |

Starting material contained 17.1 gm. of A and 8.25 gm. of B. Therefore, total recovery in all fractions was 91% of A and 57.5% of B.

| | | |
|---|---|---|
| Starting material | 57% A | 27.5% B |
| Final B-rich material | 22.7% A | 67.1% B |
| Recovery of B | 23.6% | |

*Example 2*

20 gm. of crude ostreogrycin containing 25% of factor A and 37% of factor B was stirred for 2 hours with 500 ml. (3:4) urea solution. This gave a level of 40 mgm./ml. total solid and 15 mgm./ml. factor B. As before, the suspension was then filtered, but the filtrate was extracted only once with an equal volume of ethyl acetate, without backwash, and then 2 x 1 vol. with chloroform. Assays on solvent extracts taken to solids were as follows.

|  | Weight (gm.) | A percent | B percent | A (gm.) | B (gm.) |
|---|---|---|---|---|---|
| (1) Ethyl acetate extract | 4.465 | 25.2 | 22.0 | 1.13 | 1.0 |
| (2) 1st chloroform | 5.866 | 13.0 | 73.4 | 0.81 | 4.3 |
| (3) 2nd chloroform | 0.101 | 0 | 26.3 | 0 | ---- |
| (4) Residue | 7.335 | 40.6 | 16.3 | 2.98 | 1.2 |
| Total | 17.767 |  |  | 4.92 | 6.5 |

Starting material contained 5.6 gm. A, and 7.42 gm. B. Therefore, total recovery in all fractions was 88% A and 88% B.

| | | |
|---|---|---|
| Starting material | 25% A | 37% B |
| Final B-rich | 13% A | 73% B |
| Recovery of B | 58% | |

*Example 3*

100 g. nicotinamide was dissolved in 180 ml. water and the solution was blended intimately into 200 g. acid-washed kieselguhr. This was suspended in benzene and packed into a 2½" diameter chromatogram column.

10 g. crude ostreogrycin (containing by weight 26% factor B, 22% factor A and 16% factor Z) and 25 g. nicotinamide were dissolved in 37.5 ml. water and 12.5 ml. propylene glycol. The solution was blended with 50 g. of kieselguhr and the mixture suspended in benzene and packed on top of the column. Development was carried out with benzene at first, then with benzene containing increasing proportions of chloroform. Coloured impurities came off first followed by factors Z, A and B (detected by their colour reactions with ferric chloride) as follows:

| Fraction | Volume, ml. | Solvent | Weight, g. | Factor present |
|---|---|---|---|---|
| 1 | 450 | Benzene | 1.25 | Factor Z. |
| 2 | 450 | ---do--- | 0.39 | Do. |
| 3 | 450 | ---do--- | 0.35 | Do. |
| 4 | 450 | ---do--- | 0.33 | Factors Z and A. |
| 5 | 500 | Benzene plus 10% chloroform. | 0.32 | Factor A. |
| 6 | 800 | ---do--- | 1.07 | Do. |
| 7 | 650 | ---do--- | 0.57 | Do. |
| 8 | 1,350 | Benzene plus 25% chloroform. | Neg. | Do. |
| 9 | 1,000 | ---do--- | 0.58 | Factor B. |
| 10 | 300 | Chloroform | 0.65 | Do. |
| 11 | 1,000 | ---do--- | 0.64 | Do. |

*Example 4*

15 g. urea were dissolved in 20 ml. water and the solution intimately blended into 25 g. acid-washed kieselguhr. The mixture was suspended in ethyl acetate and packed onto a chromatogram column.

1.4 g. partially purified factor B (70%) was dissolved in 50 ml. ethyl acetate and the solution poured onto the column: development was continued with ethyl acetate. The following fractions were collected.

| Fraction | Volume, ml. | Weight, g. | Factor present |
|---|---|---|---|
| 1 | 30 | 0.04 | Pigment impurity and factor A. |
| 2 | 30 | 0.10 | Do. |
| 3 | 30 | 0.13 | Pigment impurity. |
| 4 | 30 | 0.16 | Pure factor B. |
| 5 | 60 | 0.27 | Do. |
| 6 | 60 | 0.21 | Do. |
| 7 | 60 | 0.20 | Do. |
| 8 | 120 | 0.16 | Do. |
| 9 | 120 | 0.07 | Factor B and pigment impurity. |

*Example 5*

A partition chromatography was carried out using as mobile phase equal parts of ethyl acetate and benzene. The static phase was 50% w./w. aqueous urea solution on kieselguhr.

1 g. crude ostreogrycin (containing by weight 27% factor B, 40% factor A and 17% factor Z) was dissolved in 5 ml. ethyl acetate with 0.5 ml. methanol. 5 ml. urea solution and 5 ml. benzene were added.

The aqueous phase was mixed into 4 g. acid-washed kieselguhr and slurried with the mobile phase.

The slurry was packed onto a column containing 35 ml. of static phase absorbed into 28 g. acid-washed kieselguhr. Height of column packing was five inches.

Passage of mobile phase through the column removed factor Z in 50 ml. after commencement of coloured eluate. Factor A was completely eluted in 200 ml. Factor B was present in the eluate after 225 ml. and occupied 325 ml.

224 mg. of pure factor B was recovered in 95% yield.

We claim:

1. A process for the separation of a mixture comprising at least two factors of the ostreogrycin group produced by the culture of the organism *Streptomyces ostreogriseus* NRRL No. 2558, which comprises distributing said mixture in a two phase solvent system, one phase comprising an aqueous solution of a water-soluble amide selected from the group consisting of urea, nicotinamide, an amide of a lower aliphatic acid containing from 1–4 carbon atoms, an N-alkyl amide of a lower aliphatic acid containing from 1–4 carbon atoms, and an N,N-dialkyl amide of a lower aliphatic acid containing 1–4 carbon atoms, said alkyl groups containing from 1–4 carbon atoms, and the other phase an organic solvent for at least one of said factors at least partially immiscible with said aqueous solution the partition coefficients of at least two of said factors being markedly different as between said aqueous and organic phases, separating said phases and recovering an ostreogrycin factor of increased purity from at least one of said phases.

2. A process as claimed in claim 1 in which the mixture comprises at least two of the ostreogrycin factors A, B and Z.

3. A process as claimed in claim 1 which is carried out by counter-current extraction.

4. A process as claimed in claim 1 which is carried out by partition chromatography.

5. A process as claimed in claim 1 in which the mixture is dissolved in the aqueous amide solution and the solution is extracted with said organic solvent.

6. A process as claimed in claim 5 in which said aqueous amide solution is a solution of urea containing from 0.5–1 part by weight of urea to 1 part of water.

7. A process as claimed in claim 5 in which said amide is one liquid at 20° C. and said solution contains from 25% to 75% of said amide.

8. A process as claimed in claim 7 in which said amide is one liquid at 20° C. and said solution contains from 40% to 60% of said amide.

9. A process as claimed in claim 5 in which the amide is one solid at 20° C. and the aqueous solution thereof is at least 50% saturated.

10. A process as claimed in claim 9 in which said solution is at least 75% saturated.

11. A process as claimed in claim 9 in which said solution is substantially saturated.

12. A process for the separation of a mixture comprising factor Z and at least one other factor of the ostreogrycin group produced by the culture of the organism *Streptomyces ostreogriseus* NRRL No. 2558, which comprises dissolving said mixture in an aqueous solution of a water-soluble amide selected from the group consisting of urea, nicotinamide, an amide of a lower aliphatic acid containing from 1–4 carbon atoms, an N-alkyl amide of a lower aliphatic acid containing from 1–4 carbon atoms, and an N,N-dialkyl amide of a lower aliphatic acid containing 1–4 carbon atoms, said alkyl groups containing from 1–4 carbon atoms, extracting said aqueous solution with an aromatic hydrocarbon, and recovering factor Z from said aromatic hydrocarbon.

13. A process for the separation of a mixture comprising factor A and at least one other factor of the ostreogrycin group produced by the culture of the organism *Streptomyces ostreogriseus* NRRL No. 2558, which comprises dissolving said mixture in an aqueous solution of a water-soluble amide selected from the group consisting of urea, nicotinamide, an amide of a lower aliphatic acid containing from 1–4 carbon atoms, an N-alkyl amide of a lower aliphatic acid containing from 1–4 carbon atoms, and an N,N-dialkyl amide of a lower aliphatic acid containing 1–4 carbon atoms, said alkyl groups containing from 1–4 carbon atoms, extracting said aqueous solution with a lower aliphatic ester of a lower aliphatic acid and recovering factor Z from said ester.

14. A process for the separation of a mixture comprising factor B and at least one other factor of the ostreogrycin group produced by the culture of the organism *Streptomyces ostreogriseus* NRRL No. 2558, said other factor being selected from the group consisting of factor A and factor Z, which process comprises dissolving said mixture in an aqueous solution of a water-soluble amide selected from the group consisting of urea, nicotinamide, an amide of a lower aliphatic acid containing from 1–4 carbon atoms, an N-alkyl amide of a lower aliphatic acid containing from 1–4 carbon atoms, and an N,N-dialkyl amide of a lower aliphatic acid containing 1–4 carbon atoms, said alkyl groups containing from 1–4 carbon atoms, extracting said aqueous solution with a lower alkyl ester of a lower aliphatic acid to preferentially extract said other factor from said aqueous solution, thereafter extracting said aqueous solution with a chlorinated hydrocarbon, and recovering factor B from said chlorinated hydrocarbon.

References Cited in the file of this patent

UNITED STATES PATENTS

| | | |
|---|---|---|
| 2,480,517 | Stecher | Aug. 30, 1949 |
| 2,664,419 | Lott | Dec. 29, 1953 |
| 2,744,892 | Katz | May 8, 1956 |

FOREIGN PATENTS

| | | |
|---|---|---|
| 793,797 | Great Britain | Apr. 23, 1958 |

OTHER REFERENCES

Vanderhaeghe et al.: Antibiotics and Chemotherapy, November 1957, pp. 601–614.

Gans et al.: J.A. Ph. A. Sc. Ed., pp. 587–591, October 1957.